Nov. 24, 1936. H. A. FREEDMAN Re. 20,181
BEACH CHAIR
Original Filed Aug. 27, 1934 2 Sheets-Sheet 1
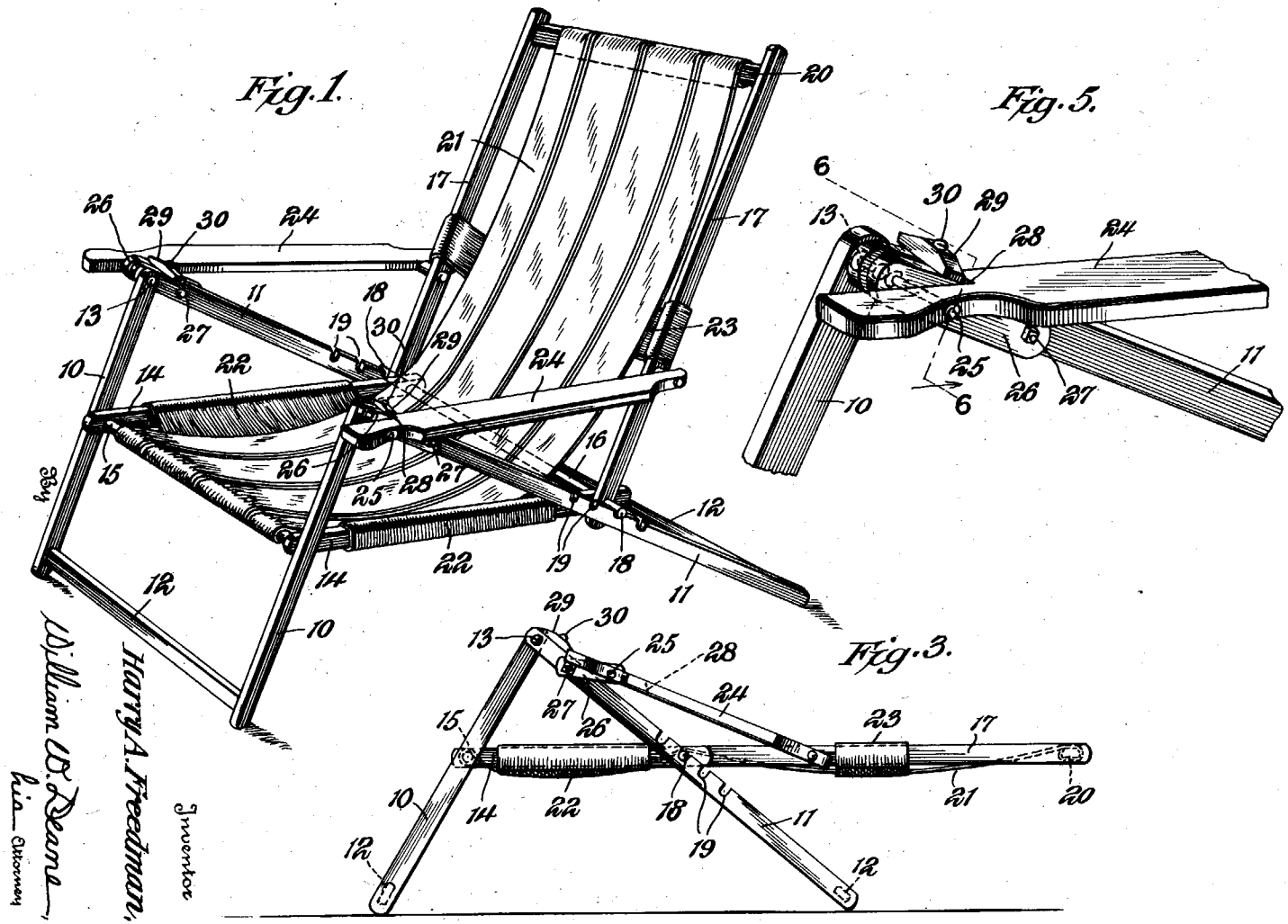

Nov. 24, 1936. H. A. FREEDMAN Re. 20,181
BEACH CHAIR
Original Filed Aug. 27, 1934 2 Sheets-Sheet 2
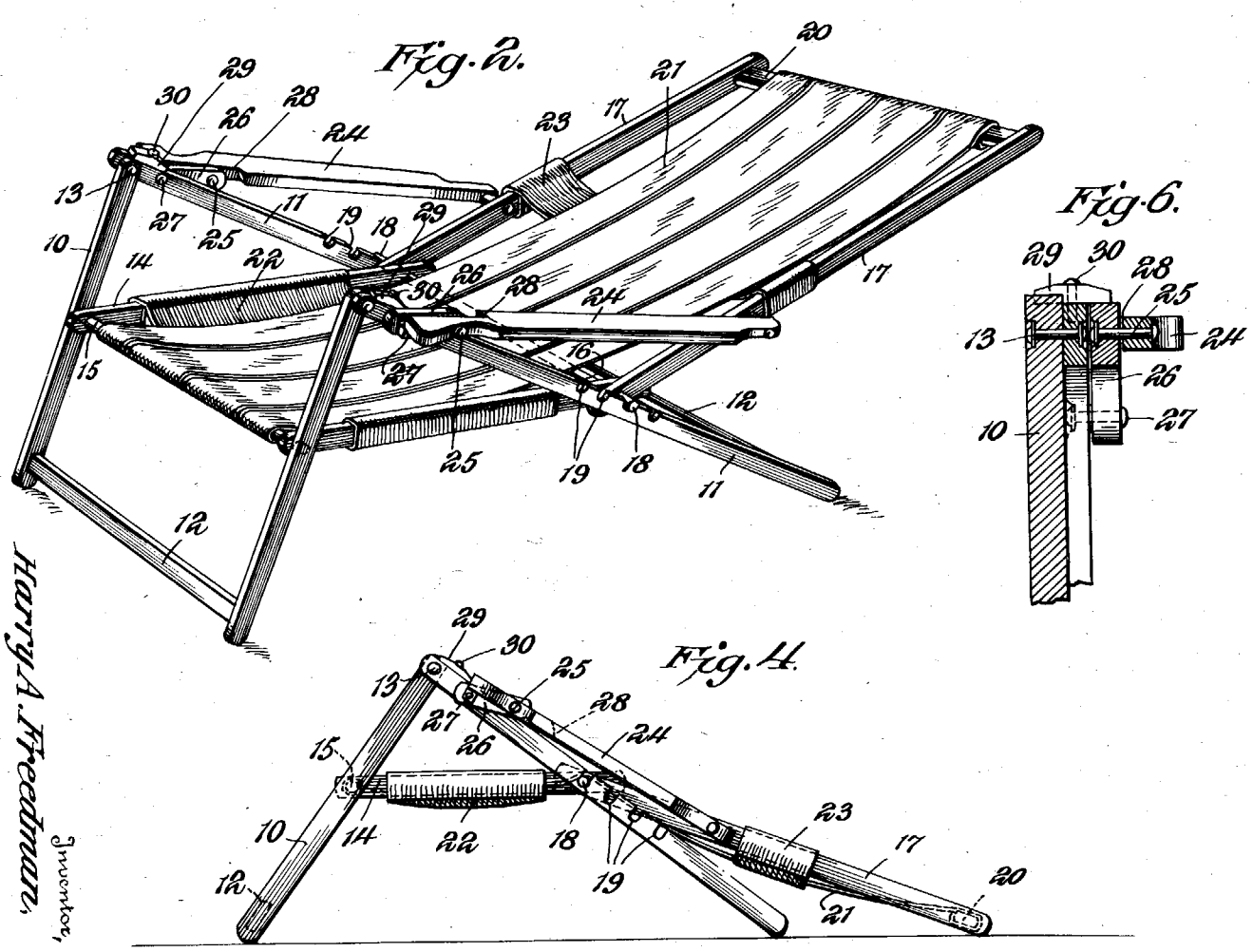
Inventor,
Harry A. Freedman,
By William W. Deane
his Attorney Reissued Nov. 24, 1936 Re. 20,181

UNITED STATES PATENT OFFICE 20,181

BEACH CHAIR

Harry A. Freedman, Brooklyn, N. Y.

Original No. 1,985,823, dated December 25, 1934, Serial No. 741,667, August 27, 1934. Application for reissue July 2, 1936, Serial No. 88,697

7 Claims. (Cl. 155—118)

The object of the invention is to provide a beach chair combining in the one structure a quick adjustment from the upright to the reclining position and what might be referred to as a permanent adjustment, so that the occupant, having made the initial or permanent adjustment to suit his convenience, may then during occupancy quickly shift from upright to reclining position or vice versa; to provide a chair construction in which the initial or permanent adjustment governs the degree of inclination in the reclining position of the quick adjustment, thereby providing for various positions to suit practically all conditions under which the user on a beach or elsewhere may desire to support his or her body; and to provide a chair of the kind indicated which is of simple form, susceptible of cheap manufacture and of a character in which the parts are unlikely to become disarranged.

With this object in view, the invention consists in a construction and combination of parts of which a preferred embodiment is illustrated in the accompanying drawings, wherein:

Figure 1 is a perspective view of a chair constructed in accordance with the invention.

Figure 2 is a similar view with a quick adjustment set to a reclining position when the initial or fixed adjustment is that of Figure 1.

Figure 3 is a side elevational view with the quick adjustment set to reclining position but with a different setting of the fixed or initial adjustment.

Figure 4 is a view similar to Figure 3 but with a changed initial adjustment from that of Figure 3.

Figure 5 is a detail perspective view of the connection between the arm and legs that provides for the quick adjustment.

Figure 6 is a sectional view on the plane indicated by the line 6—6 of Figure 5.

The chair is supported on the front and rear legs 10 and 11 arranged in pairs and connected at their lower ends with cross-bars 12. At their upper ends, the front and rear legs are pivotally connected together with pivot studs, as indicated at 13. Thus the front and rear legs may be relatively adjusted to vary the angular relation between them and when the desired relation is secured, the leg positions are retained by the seat frame which comprises side rails 14, the front cross-rod 15 and the rear cross-rod 16, the former being extended through the side rails and entering sockets formed on the inner faces of the front legs. The side rails 14 loosely engage the cross-bar 15, so that in adjustment they may swing relative to the front legs. The cross-bar 16 has a similar connection with the side rails 14 but is extended far enough through them to pass through the side rails 17 of the back frame and in addition provide the projecting studs 18 which seat selectively in any of the notches 19 of which each of the rear legs 11, on its upper edge is provided with a series. The back cross-bar 16 has a rigid connection with the side rails 17 which are interconnected at their upper ends with a cross-bar 20.

A web 21 is terminally secured to the cross-bars 15 and 20 and serves both as a seat and back, the seat portion being reinforced by a transverse web 22 spanning the side rails 14. A webbing strip 23 spans the side rails 17 at intermediate points to reinforce the back portion of the web 21.

Arms 24 are pivotally connected with the side rails 17 at the rear ends of the former, pivot studs 25 effecting pivotal connection between the forward ends of the arms and the links 26 which, at the ends remote from the pivotal connections 25 are pivotally connected as at 27, with the rear legs 11 near the upper ends of the latter. When the links are arranged in parallelism with the rear legs the upper edges both of them and of the rear legs abut the shoulders 28 with which the arms 24 are formed. Buttons 29 pivotally mounted as at 30, on the upper edges of the rear legs may be swung in positions in alignment with the legs where they are in unobstructing relation to the links, or transversely of the legs where they overlap the links on the upper edges, thus preventing in cooperation with the shoulders 28 any independent swinging movement of the links.

In the use of the chair, the initial or fixed adjustment is effected to suit the convenience of the user by engaging the studs 18 in the proper notches or seats 19. With the buttons 29 overlapping the links 26, the upright position of the chair is maintained for the initial adjustment. If the occupant desires a reclining position, he can rotate the buttons in parallelism with the legs and thus release the links, when the back of the chair will swing downwardly as shown in Figure 2, the links swinging about their pivotal connections 27 as well as about their pivotal connections 25 with the arms.

If the initial adjustment be such as to give the back a more pronounced inclination, as by seating the studs 18 in higher notches 19, the quick adjustment will provide for the full prone position, as shown in Figure 3. If the initial adjustment be with the studs 18 in the highest notches 19, the quick adjustment will provide for a downwardly and rearwardly inclined position of the back, as shown in Figure 4, when the back may serve as a lean-to for a person seated directly on the supporting means as for example, the beach, when the seat portion may serve as a rest for a pillow, or a seat for another occupant, or what not.

When not in use, the buttons may be moved out of their obstructing positions to the links and the chair may be folded up into compact form in the usual manner.

The invention having been described, what is claimed as new and useful is:

1. A chair of the kind indicated comprising pivotally connected front and rear legs, pivotally connected back and seat frames of which the latter at the forward end is pivotally connected with the front legs, adjustable connections between the rear legs and the seat and back frames to provide an initial inclination of the back frame, arms pivotally connected with the back frame, foldable extensible connections between the arms and certain of the legs to provide for a quickly attained reclining position of the back frame, and means to render the extensible connections inoperative.

2. A chair of the kind indicated comprising pivotally connected front and rear legs, pivotally connected back and seat frames of which the latter at the forward end is pivotally connected with the front legs, adjustable connections between the rear legs and the seat and back frames to provide an initial inclination of the back frame, arms pivotally connected with the back frame, links having terminal pivotal connections with the rear legs at points spaced from the latters' pivotal connection with the front legs, said links having terminal pivotal connections with the arms at the forward ends of the same, the arms having shoulders abutting the rear legs in one position of the back, and latching means to render the links inoperative.

3. A chair of the kind indicated comprising pivotally connected front and rear legs, pivotally connected back and seat frames of which the latter at the forward end is pivotally connected with the front legs, adjustable connections between the rear legs and the seat and back frames to provide an initial inclination of the back frame, arms pivotally connected with the back frame, and links having terminal pivotal connections with the rear legs at points spaced from the latters' pivotal connection with the front legs, said links having terminal pivotal connections with the arms at the forward ends of the same, the arms being formed with shoulders abutting the links on one edge in one position of the links, and latching means to render the links inoperative.

4. A chair of the kind indicated comprising pivotally connected front and rear legs, pivotally connected back and seat frames of which the latter at the forward end is pivotally connected with the front legs, adjustable connections between the rear legs and the seat and back frames to provide an initial inclination of the back frame, arms pivotally connected with the back frame, links having terminal pivotal connections with the rear legs at points spaced from the latters' pivotal connection with the front legs, said links having terminal pivotal connections with the arms at the forward ends of the same, and buttons pivoted on the rear legs and movable into and out of obstructing position to the links, the arms having means to limit the movement of the links in one direction when the buttons limit the movement in the other direction.

5. A chair of the kind indicated comprising pivotally connected front and rear legs, pivotally connected back and seat frames of which the latter at the forward end is pivotally connected with the front legs, adjustable connections between the rear legs and the seat and back frames to provide an initial inclination of the back frame, arms pivotally connected with the back frame, links having terminal pivotal connections with the rear legs at points spaced from the latters' pivotal connection with the front legs, said links having terminal pivotal connections with the arms at the forward ends of the same, the arms being formed with shoulders abutting the links on one edge in one position of the links, and buttons pivoted on the rear legs and movable into and out of obstructing position to the links.

6. An adjustable folding chair comprising connected leg frames, one at each side of the chair, each leg frame having a front and a rear leg pivotally connected adjacent to their upper portions, an arm rest pivotally connected to each leg frame, a back frame pivotally connected to said arm rests, a seat frame pivotally connected at the rear to the back frame adjacent to the lower portion thereof and adjacent its front to the front leg of each leg frame, means for pivotally supporting the back frame and the rear of the seat frame on the rear legs of said leg frame, said latter means being adjustable to vary the inclination of the back and simultaneously the relationship of the legs of the leg frames with respect to each other and also movable to permit folding of the chair, said pivotal connections of the arm rests with the leg frames embodying means whereby the distance between the pivotal points of said arm rests may be extended to increase the inclination of the back on the rear legs of the leg frames without affecting the relationship of the legs.

7. An adjustable folding chair comprising connected leg frames, one at each side of the chair, each leg frame having a front and a rear leg pivotally connected adjacent their upper portions, an arm rest pivotally connected to each leg frame, a back frame pivotally connected to said arm rests, a seat frame pivotally connected at the rear to the back frame adjacent the lower portion thereof and adjacent its front to the front leg of each leg frame, means for pivotally supporting the back frame and the rear of the seat frame on the rear legs of said leg frames, said latter means being movable to permit folding of the chair and also adjustable along the rear legs to vary the inclination of the back and simultaneously the relationship of the legs of the leg frames with respect to each other, and additional means for varying the inclination of the back comprising an extensible connection of the arm rest with respect to one of its pivotal connections, said latter means providing for tilting of the back pivotally on the supports afforded by the rear legs of the leg frames without altering the relationship of the legs, said two inclination varying means providing for varying the inclination of the chair back through relatively wide limits.

HARRY A. FREEDMAN.